June 28, 1927.
H. E. MARSH
1,633,597
WINDSHIELD WIPER
Filed Sept. 7, 1926
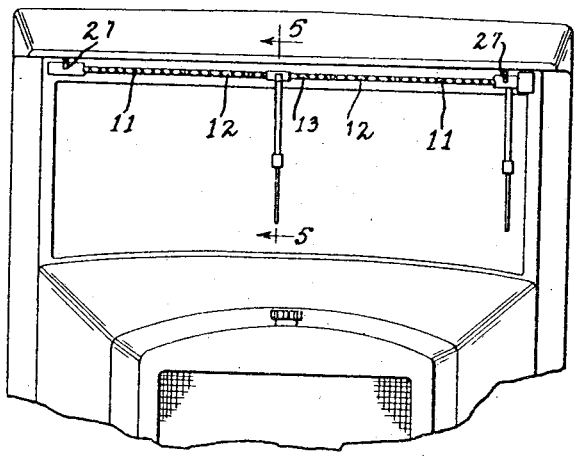
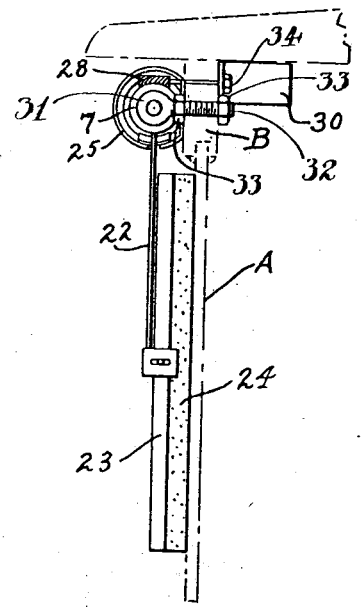
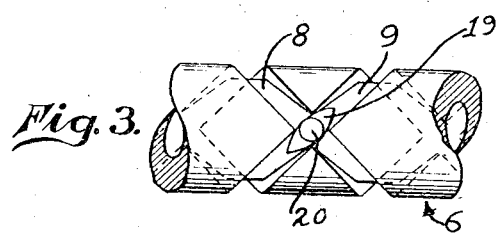
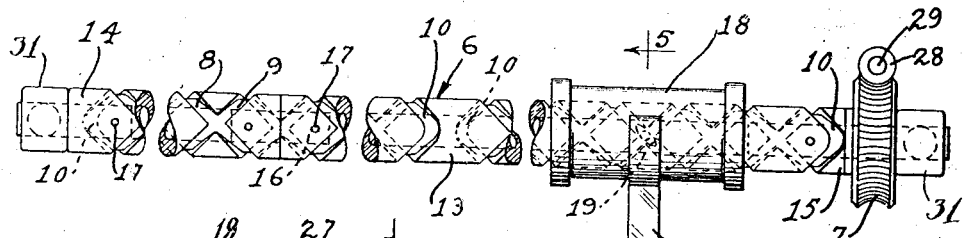
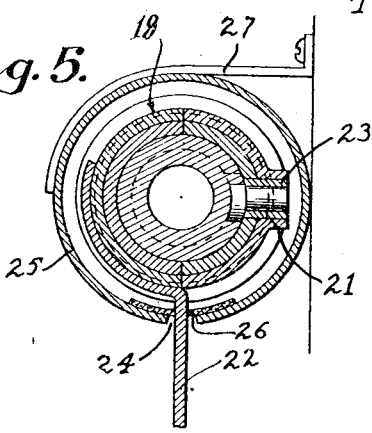
Inventor
Howard E. Marsh
By Lyon & Lyon
Attorneys Patented June 28, 1927.

1,633,597

UNITED STATES PATENT OFFICE.

HOWARD E. MARSH, OF LOMPOC, CALIFORNIA.

WINDSHIELD WIPER.

Application filed September 7, 1926. Serial No. 134,021.

This invention relates to windshield wipers of the type employed, for example, for removing moisture and dust from windshields of motor cars.

An object of the invention is to effect a reciprocating motion of the wiper bar lengthwise of the windshield so as to clean substantially the surface of the windshield the full length thereof.

Another object is to effect the reciprocating motion of the wiper bar by the use of a non-reversing motor.

Another object is to provide a construction which can readily be adapted to windshields of different lengths.

Further objects and advantages will appear in the subjoined detailed description.

The accompanying drawings illustrate the invention:

Figure 1 is a front view of a windshield wiper constructed in accordance with the provisions of this invention, the same being shown mounted upon the windshield of a motor car. The shaft housing is partly broken away.

Figure 2 is an enlarged edge view of the windshield wiper from the right in Figure 1, the motor car parts being indicated in dotted lines.

Figure 3 is an enlarged fragmental view of the screw shaft and the shoe.

Figure 4 is an enlarged broken longitudinal view of the screw shaft with the traveling member and worm gear thereon, the worm operating said gear also being shown.

Figure 5 is an enlarged sectional view on the line indicated by 5—5, Figure 1, some of the parts also being in section on the line 5—5, Figure 4.

Referring to the drawings, a screw shaft is indicated at 6 and is rotated by a worm gear 7. The screw shaft is made with a double thread, a right hand thread 8 and a left hand thread 9, the two threads being connected at suitable points by a return groove 10. In this particular instance, the shaft 6 is of sectional construction in order that it may be made of suitable lengths for various lengths of windshields. For example, in the instance shown, there are longer threaded sections 11, shorter threaded sections 12, a coupling section 13, and end sections 14, 15. The shaft is hollow, in this instance, and the sections are secured together at the joints by pins 16 in the bore of the shaft extending across the joint, and taper pins 17 driven through the shaft into the pins 16.

In this particular instance, the coupling section 13 forms at its opposite ends two of the return grooves 10, and end sections 14, 15 are also each provided with one of the return grooves.

On the screw shaft 6 is one or more traveling members 18 which, in this instance, is in the form of a sleeve. Though one traveling member may be employed to travel from end to end of the screw-threads of the shaft, it may be preferable in some instances to provide a plurality of said members, as shown, one to travel along half of the length of the windshield and the other to travel along the other half.

Within each of the members 18 is a shoe 19 adapted to ride in the screw-threads 8, 9. The shoe is longer than the width of the thread so as to track properly in the thread, and projecting outwardly from each shoe is a stud 20 which projects into a socket 21 in the member 18.

To each member 18 is secured an arm 22 carrying a wiper bar 23 of any well known or preferred construction. In this instance, each wiper bar 23 constitutes a squeegee, the rubber strip thereof being indicated a 24 and contacting with the windshield which is indicated at A.

Each stud 20 is mounted to turn in a bushing 23 in the socket 21, said bushing constituting the bearing for the stud so that the shoe 19 can turn on its axis as it tracks the return grooves 10.

Each arm 22 is guided and, for this purpose, said arm projects through a slot 24 in a longitudinally extending guide 25. In this instance, the guide 25 is cylindrical and constitutes a housing for the shaft, thus preventing the entrance of dirt to the screw-threads, said housing extending from end to end of the shaft. The edges of the slots 24 are provided with sealing members 26 to seal the slot, said members being made of felt, for example, and having their adjacent edges substantially in contact excepting where the arms 22 pass through the slot 24. The housing 25 is attached by brackets 27 to the upper frame member B of the windshield A.

The worm gear 7 is operated by a worm 28 on the shaft 29 of a rotary motor 30. This motor is not illustrated and described in detail herein as the construction thereof is well understood in the art relating to vacuum operated windshield wipers. It suffices to state that the vacuum of the motor that operates the motor car is applied to the motor 30 so as to turn the shaft 29, thus rotating the screw shaft 6.

In operation, rotation of the screw shaft 6 causes the shoes 19 to travel first in one direction and then in the opposite direction and, in this instance, each wiper bar will be caused to traverse one-half of the length of the windshield, each wiper bar operating from one end of the windshield to approximately the middle thereof and then back again to the end.

Other power than the vacuum operated motor may be utilized, if desired, to turn the screw shaft and, it will be noted, that because of the requirement that the motor 30 operate in one direction only, said motor may be more simply constructed than a motor that operates alternately in opposite directions, as is necessary with a large number of windshield wipers at present in use.

In the instance shown in the drawings, the screw shaft bearings 31 are connected with the frame member B of the windshield by threaded studs 32 and nuts 33. The motor 30 is secured to the frame member B by bolts 34.

I claim:

1. A wind shield wiper comprising a sectional shaft, some of the shaft sections having right and left screw threads, the end sections having grooves connecting the adjacent ends of the screw threads, a coupling means for each two adjacent shaft sections, a shoe, means to hold the shoe engaged with the threads as the shaft turns, a wiper bar connected with the shoe, means to rotatably support the shaft on a wind shield, a motor, means to secure the motor to said wind shield, and driving gearing connecting the motor with the shaft.

2. A wind shield wiper comprising a sectional shaft, some of the shaft sections having right and left screw threads, the end sections and another section interposed between two of the first mentioned sections having grooves connecting the adjacent ends of the screw threads of adjacent sections, a coupling means for each two adjacent shaft sections, a shoe, means to hold the shoe engaged with the threads as the shaft turns, a wiper bar connected with the shoe, means to rotatably support the shaft on a wind shield, a motor, means to secure the motor to said wind shield, and driving gearing connecting the motor with the shaft.

3. A windshield wiper comprising a sectional shaft including end sections and a center section between the end sections, means for interconnecting said sections, the center section having right and left screw threads and the end sections having grooves connecting adjacent ends of the screw threads, a shoe engaging the threads of the shaft sections, a wiper connected with the shoe, means to rotatably support the shaft on a windshield, and power means associated with the shaft for rotating the same.

4. A windshield wiper comprising a right and left threaded screw shaft, non-threaded bearing extensions detachably associated with the opposite ends of the shaft, bearings associated with said extensions for rotatably mounting the shaft on a windshield and for holding the same from endwise movement, a shoe engaging the threads of the shaft, a wiper bar connected with the shoe, and power means associated with the shaft for imparting rotation thereto.

5. A windshield wiper comprising a sectional shaft including tubular end sections and a tubular section between the end sections, one section having right and left hand screw threads, and the end sections having grooves connecting the adjacent ends of the screw threads, means received within and extending beyond the ends of the tubular sections for detachably connecting said sections to rotate in unison and for extending beyond the end sections to provide bearing extensions, means cooperating with said bearing extensions for rotatably mounting said shaft on a windshield and holding the same from endwise movement, a shoe engaging the threads of the shaft, a wiper bar connected with the shoe, and power means associated with the shaft for imparting rotation thereto.

Signed at Los Angeles, California, this 30th day of August 1926.

HOWARD E. MARSH.